US012447446B2

(12) United States Patent
Goshima et al.

(10) Patent No.: US 12,447,446 B2
(45) Date of Patent: Oct. 21, 2025

(54) BUBBLE FORMATION DEVICE AND BUBBLE FORMATION METHOD

(71) Applicant: Kagoshima University, Kagoshima (JP)

(72) Inventors: Takashi Goshima, Kagoshima (JP); Yudai Mikuni, Kagoshima (JP)

(73) Assignee: Kagoshima University, Kagoshima (JP)

( * ) Notice: Subject to any disclaimer, the term of this patent is extended or adjusted under 35 U.S.C. 154(b) by 978 days.

(21) Appl. No.: 17/612,772

(22) PCT Filed: May 18, 2020

(86) PCT No.: PCT/JP2020/019586
§ 371 (c)(1),
(2) Date: Nov. 19, 2021

(87) PCT Pub. No.: WO2020/235519
PCT Pub. Date: Nov. 26, 2020

(65) Prior Publication Data

US 2022/0241736 A1 Aug. 4, 2022

(30) Foreign Application Priority Data

May 20, 2019 (JP) ................................ 2019-094202

(51) Int. Cl.
*B01F 23/233* (2022.01)
*B01F 27/053* (2022.01)
(Continued)

(52) U.S. Cl.
CPC ........ *B01F 23/233* (2022.01); *B01F 27/0531* (2022.01); *B01F 27/93* (2022.01); *B01F 33/452* (2022.01); *B01F 2215/0427* (2013.01)

(58) Field of Classification Search
CPC .... B01F 23/233; B01F 27/0531; B01F 27/93; B01F 33/452; B01F 2215/0427; B01F 23/2368; B01F 27/941; B01F 33/811
See application file for complete search history.

(56) References Cited

U.S. PATENT DOCUMENTS 1,084,210 A 1/1914 Howard
4,959,183 A * 9/1990 Jameson ............. B03D 1/1412 210/219
(Continued)

FOREIGN PATENT DOCUMENTS

EP 1725215 B1 7/2007
JP S62-095725 U 6/1987
(Continued)

OTHER PUBLICATIONS

Translation of JP2008119567A (Year: 2008).*
(Continued)

*Primary Examiner* — Jennifer Dieterle
*Assistant Examiner* — Phillip Y Shao
(74) *Attorney, Agent, or Firm* — K&L Gates LLP; Brian Novak; Giorgios N. Kefallinos

(57) ABSTRACT

A bubble formation apparatus (500) includes: a rotor (100); a container (200) in which the rotor (100) is housed together with a liquid (LQ) and a gas (GS); and a rotary device (300) that causes rotation of the rotor (100) with the rotor (100) being pressed against an inner lower surface (221) that is the inner surface of the container (200). A bubble is formed by periodically repeating pressurization and depressurization of a mixture of the gas (GS) and the liquid (LQ) in a gap between the inner lower surface (221) and a portion, pressed against the inner lower surface (221), of the rotor (100) due to the rotation of the rotor (100) by the rotary device (300).

18 Claims, 17 Drawing Sheets

(51) Int. Cl.
*B01F 27/93* (2022.01)
*B01F 33/452* (2022.01)

(56) References Cited

U.S. PATENT DOCUMENTS 5,318,360 A * 6/1994 Langer ................ B01F 23/2331
261/87
9,108,170 B2 * 8/2015 Wang ...................... B01F 27/15

FOREIGN PATENT DOCUMENTS

JP 2008-119567 A 5/2008
JP 2011-140016 A 7/2011
JP 2018-034148 A 3/2018
WO 2006/120945 A1 11/2006
WO 2020/235519 A1 11/2020

OTHER PUBLICATIONS

International Search Report and Written Opinion, mailed Aug. 4, 2020, for International Application No. PCT/JP2020/019586 filed on May 18, 2020.
Extended European Search Report (EESR) dated May 31, 2023, issued in corresponding EP patent application No. 20810423.2.

* cited by examiner

BUBBLE FORMATION DEVICE AND BUBBLE FORMATION METHOD

CROSS REFERENCE TO RELATED APPLICATIONS

This application is a national phase filing of PCT/JP2020/019586, filed on May 18, 2020, which claims priority to Japanese Patent Application No. 2019-094202, filed on May 20, 2019, the entire disclosures of which are incorporated herein by reference.

TECHNICAL FIELD

The present disclosure relates to a bubble formation apparatus and a bubble formation method.

BACKGROUND ART

A bubble formation apparatus that forms bubbles using an airtight tank and a rotor that rotates on a bottom surface of the tank has been known as disclosed in Patent Literature 1. In addition to the rotor, a porous body connected to a gas source that releases a gas, and a cylinder interposed between the porous body and the rotor are placed in the tank.

In the bubble formation apparatus, the gas is released by the porous body in the tank filled with a liquid. The released gas is guided to the periphery of the rotor by the cylinder. Bubbles are formed by stirring the gas, guided to the periphery of the rotor, by the rotor.

CITATION LIST

Patent Literature

Patent Literature 1: Unexamined Japanese Patent Application Publication No. 2018-34148

SUMMARY OF INVENTION

Technical Problem

In addition to the tank and the rotor, at least the porous body and the cylinder are indispensably included in the above-described bubble formation apparatus, as described above. Therefore, the overall configuration of the device has been large.

An objective of the present disclosure is to provide a bubble formation apparatus and a bubble formation method, by which bubbles can be formed without requiring a large configuration.

Solution to Problem

A bubble formation apparatus according to the present disclosure includes:

a rotor;

a container in which the rotor is housed together with a liquid and a gas; and a rotary device that causes rotation of the rotor with the rotor being pressed against a to-be-pressed surface, the to-be-pressed surface being an inner surface of the container, wherein a bubble is formed by periodically repeating pressurization and depressurization of a mixture of the gas and the liquid in a gap between the to-be-pressed surface and a portion, pressed against the to-be-pressed surface, of the rotor due to the rotation of the rotor by the rotary device.

It is also acceptable that:

the rotor has magnetism, and the rotary device is magnetically coupled to the rotor via the container, to thereby cause the rotor to rotate with the rotor being pressed against the to-be-pressed surface.

It is also acceptable that:

the rotary device includes a linkage member that is mechanically linked to the rotor, and the rotary device causes the rotor to rotate with the rotor being pressed against the to-be-pressed surface using the linkage member.

It is also acceptable that at least one of a portion, pressed against the to-be-pressed surface, of the rotor or the to-be-pressed surface of the container has a recess-and-projection structure in which a recess and a projection are placed in a circumferential direction that is a direction of the rotation of the rotor.

It is also acceptable that the rotor has the recess-and-projection structure.

It is also acceptable that:

the container has an inner lower surface as the to-be-pressed surface, an inner upper surface facing the inner lower surface, and an inner side surface that joins the inner upper surface and the inner lower surface to each other, and surrounds the rotor, and the rotor is provided to be closer to a portion of the inner side surface.

It is also acceptable that the container includes an inlet through which the liquid and the gas are introduced, and a discharge port that is placed at a position different from a position of the inlet, and through which a gas-liquid mixed fluid in which the gas allowed to be a bubble is dispersed in the liquid is discharged.

It is also acceptable that the rotor has an outer surface made of a resin having hydrophobicity.

A bubble formation method according to the present disclosure includes:

encapsulating a rotor, together with a liquid and a gas, in a container; and periodically repeating pressurization and depressurization of a mixture of the gas and the liquid in a gap between a to-be-pressed surface and a portion, pressed against the to-be-pressed surface, of the rotor by causing the rotor to rotate with the rotor being pressed against the to-be-pressed surface, the to-be-pressed surface being an inner surface of the container.

It is also acceptable that:

the container has an inner lower surface as the to-be-pressed surface, an inner upper surface facing the inner lower surface, and an inner side surface that joins the inner upper surface and the inner lower surface to each other, and surrounds the rotor, and in the periodically repeating, the mixture is locally pressurized between the rotor and a portion of the inner side surface by providing the rotor to be closer to the portion of the inner side surface.

Advantageous Effects of Invention

In accordance with the bubble formation apparatus and bubble formation method of the present disclosure, a bubble is formed by periodically repeating the pressurization and depressurization of the mixture of the gas and the liquid in the gap between the to-be-pressed surface and the portion, pressed against the to-be-pressed surface, of the rotor.

A large configuration is not required because the need for a porous body that releases a gas, and a cylinder that guides, to the rotor, bubbles released by the porous body that have been conventionally required for forming bubbles is eliminated.

DESCRIPTION OF EMBODIMENTS

Figure 1:
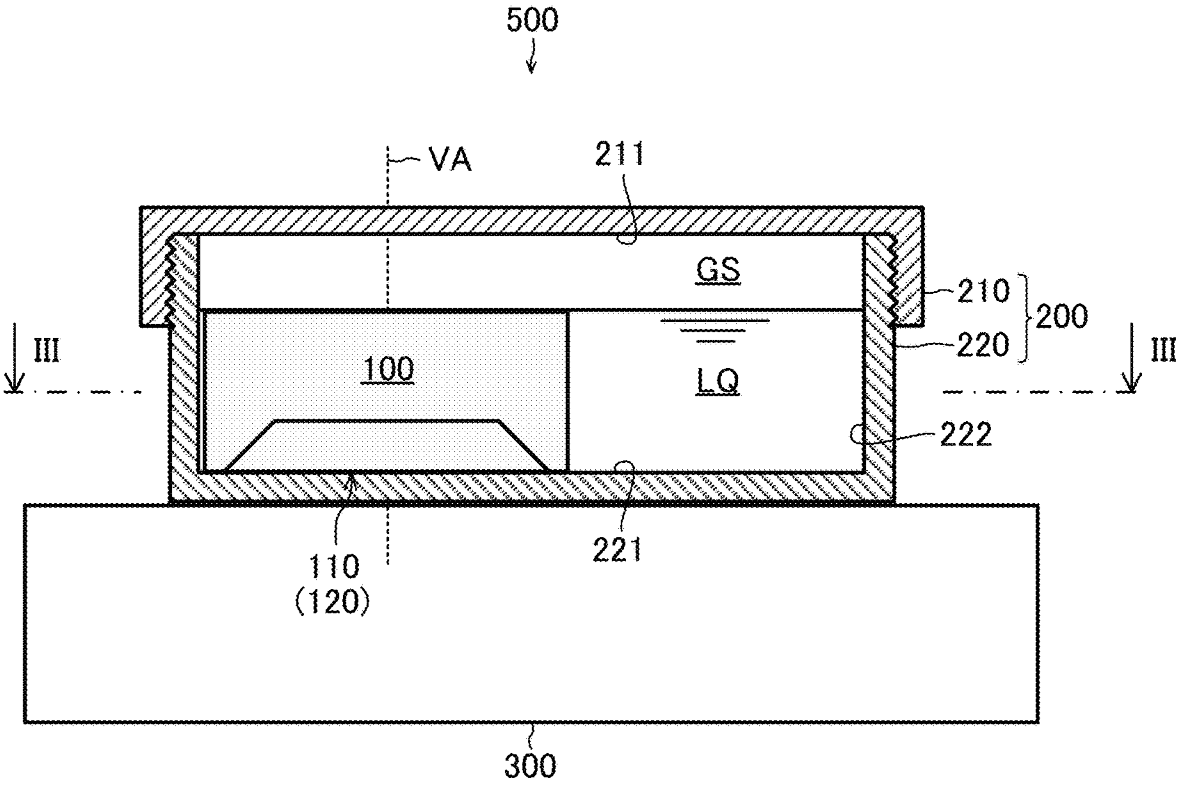
FIG. 1 is a conceptual diagram illustrating the configuration of a bubble formation apparatus according to Embodiment 1.

Bubble formation apparatuses according to Embodiments 1 to 6 will be described below with reference to the drawings. The same or corresponding portions are denoted by the same reference characters in the drawings.

Embodiment 1

As illustrated in FIG. 1, a bubble formation apparatus 500 according to the present embodiment includes a rotor 100 having magnetism, a container 200 in which the rotor 100 is housed together with a liquid LQ and a gas GS, and a rotary device 300 that is magnetically coupled to the rotor 100 via the container 200.

The container 200 includes: a flat inner upper surface 211; a flat inner lower surface 221 facing the inner upper surface 211; and an inner peripheral surface 222 as an inner side surface that joins the inner upper surface 211 and the inner lower surface 221 to each other, and surrounds the rotor 100. An airtight and fluid-tight space is defined by the inner upper surface 211, the inner lower surface 221, and the inner peripheral surface 222.

The container 200 has a configuration in which the container 200 is divided into a lid 210 including the inner upper surface 211 and a body 220 including the inner lower surface 221 and the inner peripheral surface 222. The lid 210 can be removed from the body 220. The lid 210 and the body 220 can be fitted to each other by screwing the lid 210 into the body 220. The container 200 is formed of a material having magnetic permeability.

The rotary device 300 causes the rotor 100 to rotate in a state in which the rotor 100 is pressed against the inner lower surface 221 as a to-be-pressed surface of the container 200 by magnetic force. The rotor 100 rotates about a virtual rotation axis VA extending in a direction orthogonal to the inner lower surface 221.

The rotor 100 has a structure in which a magnetic substance is covered with a resin having hydrophobicity, specifically, polytetrafluoroethylene that is a fluorine resin. In other words, the outer surface of the rotor 100 includes polytetrafluoroethylene.

Moreover, the rotor 100 has an external shape that is a generally cylindrical shape of which the central axis is the virtual rotation axis VA, as a whole. The configuration of a portion (hereinafter referred to as "back surface portion") 110, pressed against the inner lower surface 221 of the container 200, of the rotor 100 will be described below.

Figure 2:
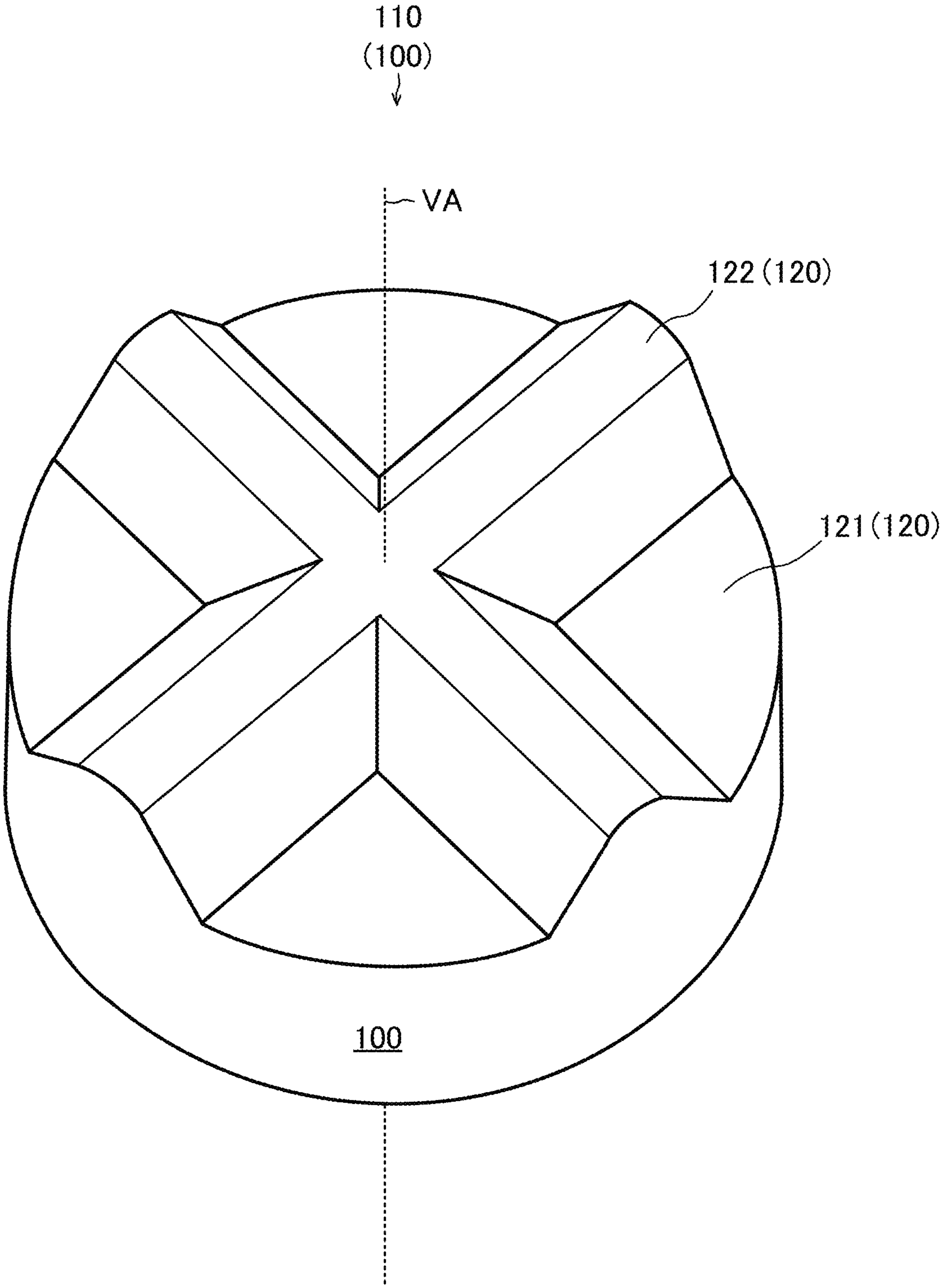
FIG. 2 is a perspective view illustrating the back surface portion of a rotor according to Embodiment 1.

As illustrated in FIG. 2, a first recess-and-projection structure 120 including recesses 121 and projections 122 is provided on the back surface portion 110 of the rotor 100. The first recess-and-projection structure 120 has a structure in which the recesses 121 and the projections 122 are alternately placed in the circumferential direction around the virtual rotation axis VA.

Specifically, each of the plurality of projections 122 radially extends in a radial direction orthogonal to the virtual rotation axis VA. The recesses 121 are provided between the projections 122 next to each other in the circumferential direction. Each recess 121 is provided in a sector form in view parallel to the virtual rotation axis VA. The first recess-and-projection structure 120 according to the present embodiment includes the four projections 122 in total and the four recesses 121 in total.

Figure 3:
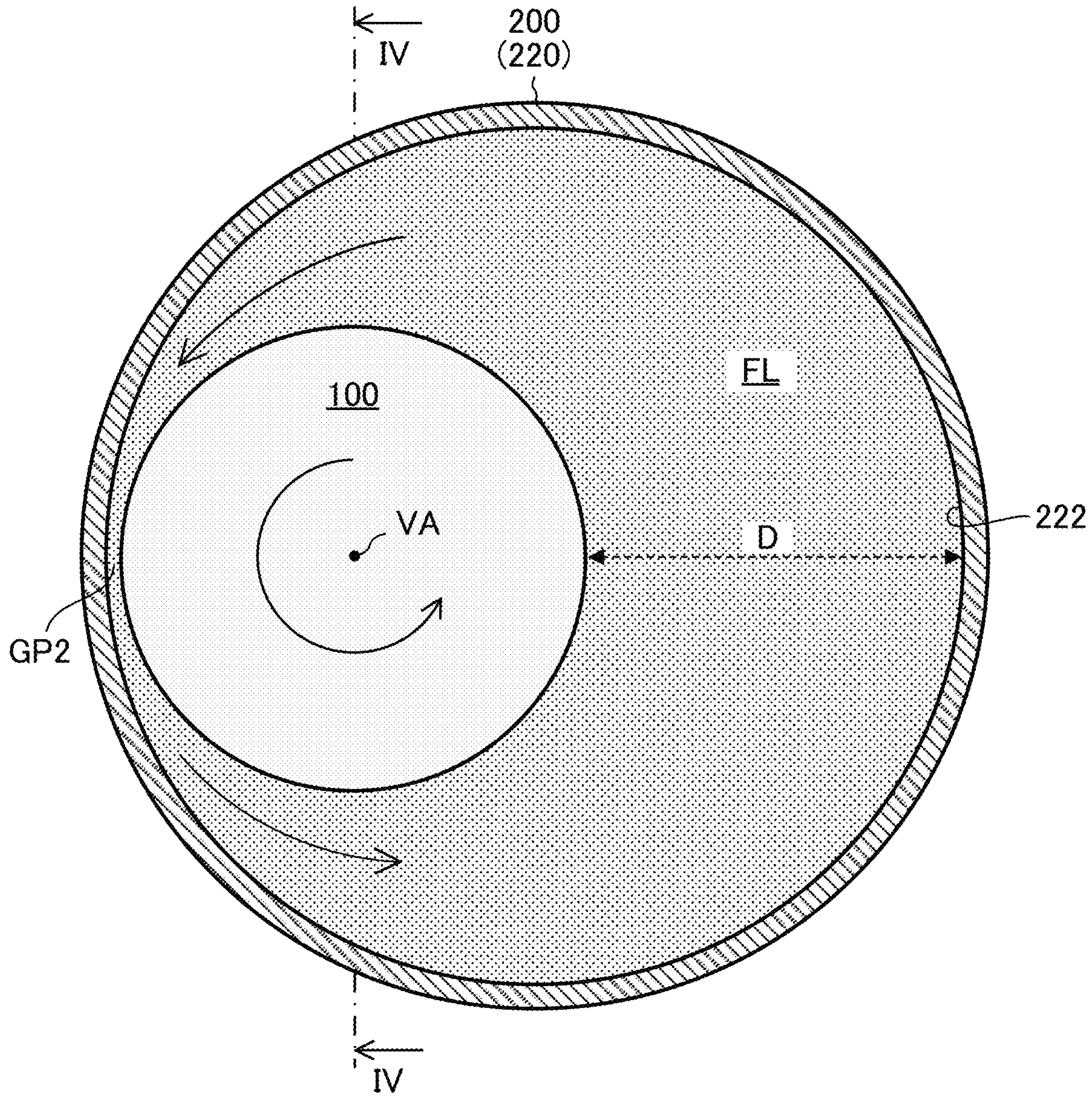
FIG. 3 is a plan view illustrating a container and the rotor according to Embodiment 1.

FIG. 3 illustrates a cross section in the position taken along the line in FIG. 1. As illustrated in FIG. 3, the upper surface, opposite to the back surface portion 110 illustrated in FIG. 2, of the rotor 100 is flat. Moreover, the container 200 is circular in planar view parallel to the virtual rotation axis VA. The container 200 has an external shape that is a cylindrical shape as a whole.

The position of the virtual rotation axis VA penetrating the rotor 100 is eccentric with respect to the position of the non-illustrated central axis of the container 200 having a cylindrical shape. In other words, the rotor 100 is placed so that the rotor 100 is closer to a portion of the inner peripheral surface 222 of the container 200.

The action of the bubble formation apparatus 500 configured as described above will be described below.

First, a user encapsulates the liquid LQ, the gas GS, and the rotor 100 in the container 200 in an airtight and fluid-tight manner in an encapsulation step, as illustrated in FIG. 1. The height of the liquid level of the liquid LQ is generally equal to the height of the upper surface, facing the inner upper surface 211, of the rotor 100. The gas GS is housed between the liquid level of the liquid LQ and the inner upper surface 211 of the container 200.

As described above, the rotor 100 is placed on the inner lower surface 221 in a state in which the rotor 100 is provided to be closer to a portion of the inner peripheral surface 222 and the back surface portion 110 faces the inner lower surface 221. The rotor 100 is allowed to rotate by the rotary device 300 in a rotation step.

Figure 4:
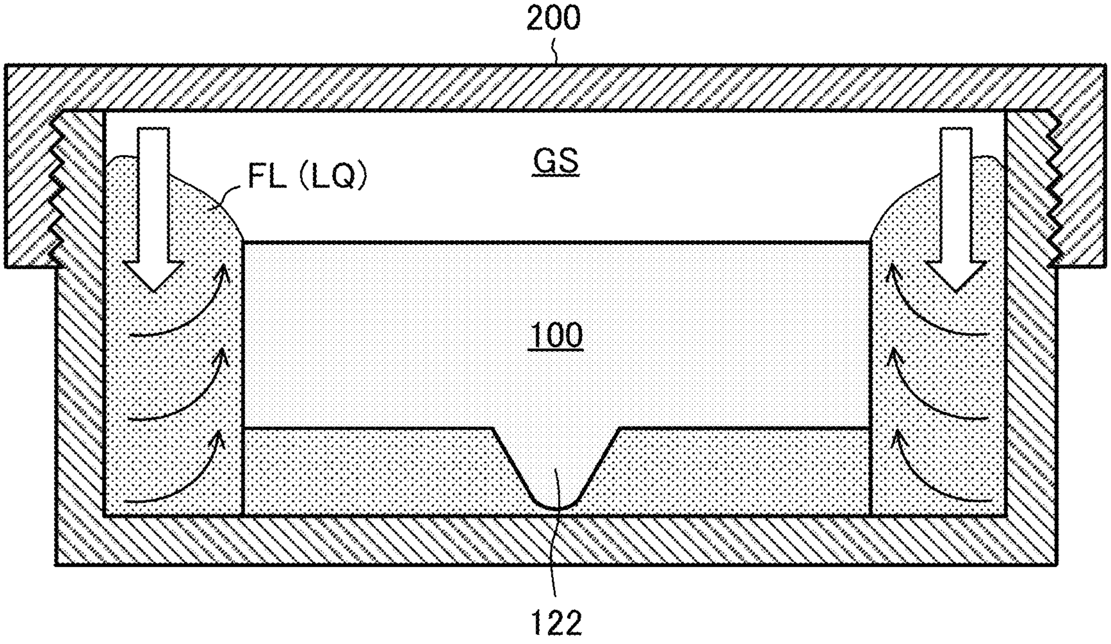
FIG. 4 is a vertical cross-sectional view illustrating the container and the rotor according to Embodiment 1.

FIG. 4 illustrates a cross section in the position taken along the line IV-IV in FIG. 3. When rotation of the rotor 100 occurs, the rotation causes the liquid LQ to rotate, whereby centrifugal force acts on the liquid LQ. Moreover, the rotation of the rotor 100 results in a decrease in the pressure of the liquid around the rotor 100. As a result, the upward flow of the liquid LQ occurs while approaching the rotor 100. When the liquid LQ that has moved upward is turned downward, the gas GS is caught by the liquid LQ.

The catching of the gas GS by the liquid LQ causes bubbles to be formed. The formed bubbles are fragmented by shearing the bubbles on the outer surface of the rotating rotor 100. Since the outer surface of the rotor 100 has hydrophobicity, the bubbles can be efficiently formed on the outer surface of the rotor 100 by the shearing in comparison with a case in which the outer surface of the rotor 100 has hydrophilicity.

The liquid LQ and the gas GS are mixed with each other in such a manner, to form a gas-liquid mixed fluid FL that is a mixture of the liquid LQ and the gas GS. In the gas-liquid mixed fluid FL, the gas GS allowed be bubbles is dispersed in the liquid LQ.

Figure 5:
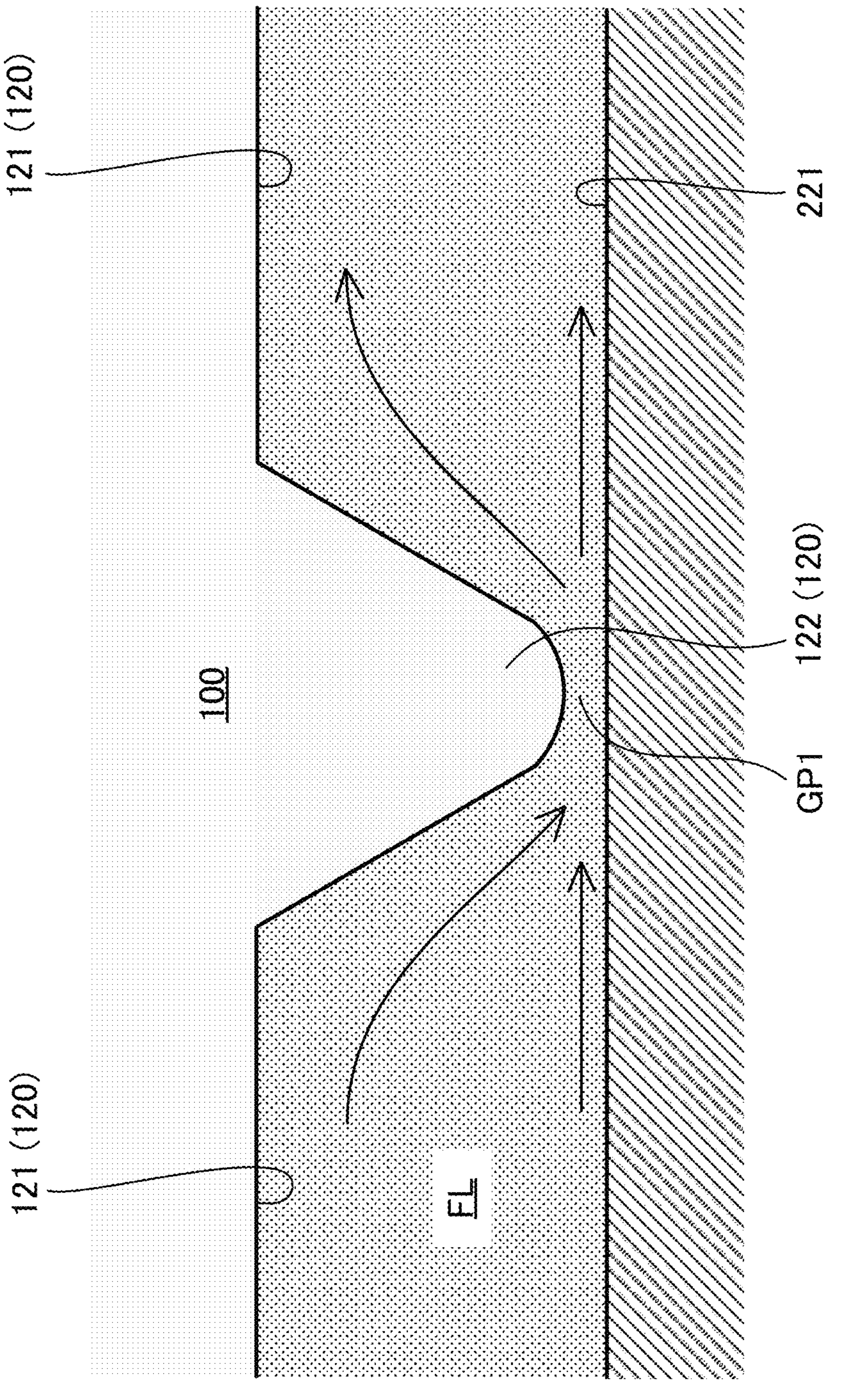
FIG. 5 is a conceptual diagram illustrating the enlarged first recess-and-projection structure of the rotor according to Embodiment 1.

The flow of the gas-liquid mixed fluid FL in a plane parallel to the virtual rotation axis VA will be described with reference to FIG. 5. In FIG. 5, the relative flow of the gas-liquid mixed fluid FL with respect to the rotor 100 is indicated by arrows. The rotation of the rotor 100 allows the gas-liquid mixed fluid FL between each recess 121 and the inner lower surface 221 to pass through a locally narrowed gap GP1 between each projection 122 and the inner lower surface 221, and to flow into the next recess 121.

The gas-liquid mixed fluid FL is pressurized in the gap GP1 between each projection 122 and the inner lower surface 221, and is sharply depressurized when flowing out from the gap GP1 into the next recess 121. Such pressurization and depressurization are periodically repeated due to the rotation of the rotor 100.

As a result, the dissolution of bubbles in the liquid LQ included in the gas-liquid mixed fluid FL is promoted, and cavitation occurs. Therefore, the bubbles in the gas-liquid mixed fluid FL are fragmented. The fragmented bubbles can be formed in such a manner.

The flow of the gas-liquid mixed fluid FL in a plane orthogonal to the virtual rotation axis VA will now be described with reference to FIG. 3. As described above, the rotor 100 is placed so that the rotor 100 is closer to a portion of the inner peripheral surface 222. Therefore, a locally narrowed gap GP2 is also provided between the rotor 100 and the portion of the inner side surface 222 in the plane orthogonal to the virtual rotation axis VA.

In FIG. 3, the relative flow of the gas-liquid mixed fluid FL with respect to the rotor 100 is indicated by arrows. The rotation of the rotor 100 allows the gas-liquid mixed fluid FL to flow so as to circle around the rotating rotor 100. The gas-liquid mixed fluid FL is locally pressurized in the gap GP2 between the rotor 100 and the inner peripheral surface 222, and is sharply depressurized when flowing out from the gap GP2.

Such pressurization and depressurization are periodically repeated due to the rotation of the rotor 100. This also results in the dissolution of bubbles and the occurrence of cavitation, and contributes to the fragmentation of bubbles included in the gas-liquid mixed fluid FL.

For allowing the pressurization of the gas-liquid mixed fluid FL in the gap GP2 and the depressurization of the gas-liquid mixed fluid FL in a case in which the gas-liquid mixed fluid FL flows out from the gap GP2 to be more reliable, the dimension of the gap GP2 is preferably not more than D/20, more preferably not more than D/40, and more preferably not more than D/80 on the assumption that the maximum value of a spacing between the rotor 100 and the inner peripheral surface 222 (hereinafter referred to as "maximum spacing") is D.

In accordance with the bubble formation apparatus 500 described above, the need for a porous body that releases a gas and a cylinder that guides, to the rotor, bubbles released by the porous body, which porous body and cylinder have been conventionally needed, is eliminated for obtaining the gas-liquid mixed fluid FL including fragmented bubbles, and therefore, the need for a large configuration is eliminated.

The results of experiments for searching conditions under which the number density of bubbles in a gas-liquid mixed fluid FL (hereinafter referred to as "bubble density") is enhanced will be described below.

Example 1

A rotor 100 having an outer diameter of 17 mm, purified water as a liquid LQ, and air as a gas GS were encapsulated in a container 200 having an inner diameter of 26.5 mm, and a gas-liquid mixed fluid FL was formed by rotating the rotor 100. The amount of the purified water was set at 4 mL. The height of the water surface of the purified water is equal to the height of the upper surface of the rotor 100. The rotation number of the rotor 100 was set at 700 rpm.

However, the rotor 100 was placed in the central portion of the inner lower surface 221 of the container 200 so that the rotor 100 was not provided to be closer to a portion of the inner peripheral surface 222 of the container 200. Specifically, the position of the virtual rotation axis VA of the rotor 100 was allowed to coincide with the position of the central axis of the container 200.

Comparative Example 1

A gas-liquid mixed fluid FL was formed under the same conditions as those of Example 1 except that a rotor 100 was placed so that the rotor 100 was vertically reversed. In other words, in Comparative Example 1, the first recess-and-projection structure 120 of the rotor 100 does not face the inner lower surface 221 of a container 200, but faces the inner upper surface 211 of the container 200. Therefore, it is impossible to obtain the action described with reference to FIG. 5.

Comparative Example 2

A gas-liquid mixed fluid FL was formed under the same conditions as those of Example 1 except that a rotor that did not include the first recess-and-projection structure 120 was used instead of the rotor 100. Since the rotor does not include the first recess-and-projection structure 120, it is impossible to obtain the action described with reference to FIG. 5, like the case of Comparative Example 1.

Evaluation 1

Figure 6:
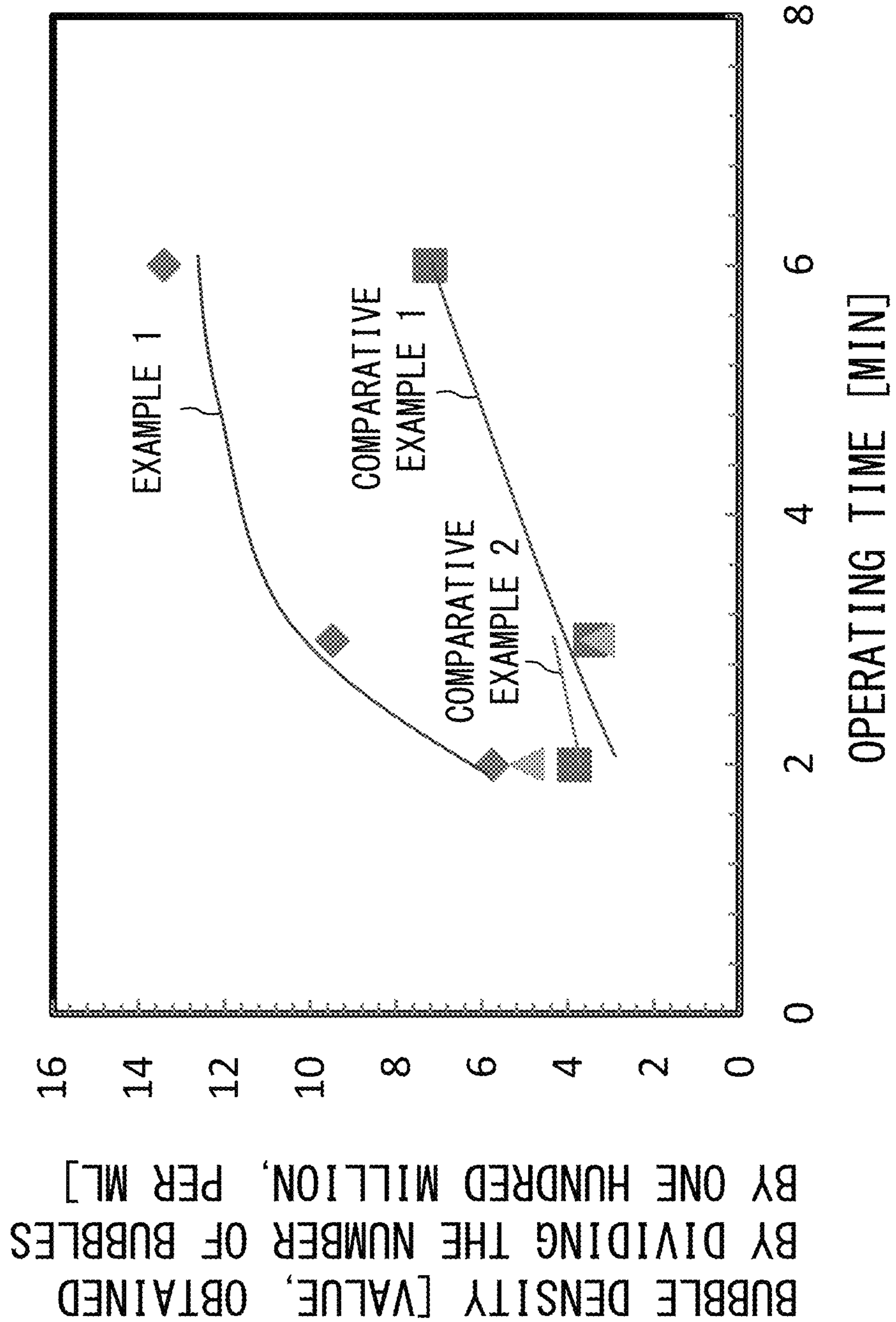
FIG. 6 is a graph indicating the bubble densities of gas-liquid mixed fluids according to Example 1 and Comparative Examples 1 and 2.

FIG. 6 is a graph indicating the bubble densities of the gas-liquid mixed fluids FL obtained in the Example 1 and Comparative Examples 1 and 2. The ordinate indicates a bubble density, and the abscissa indicates time for which the rotation of the rotor 100 is continued (hereinafter referred to as "operating time"). As illustrated in FIG. 6, the prominently high bubble density was obtained in Example 1 in comparison with Comparative Examples 1 and 2. This result shows that the first recess-and-projection structure 120 enhanced the bubble density of the gas-liquid mixed fluid FL due to the action described with reference to FIG. 5.

Example 2

A gas-liquid mixed fluid FL was formed under the same conditions as those of Example 1 except that a rotor 100 was provided to be closer to the inner peripheral surface 222 of a container 200, as illustrated in FIG. 3. The dimension of a gap GP2 illustrated in FIG. 3 was set at 0.5 mm or less.

Evaluation 2

Figure 7:
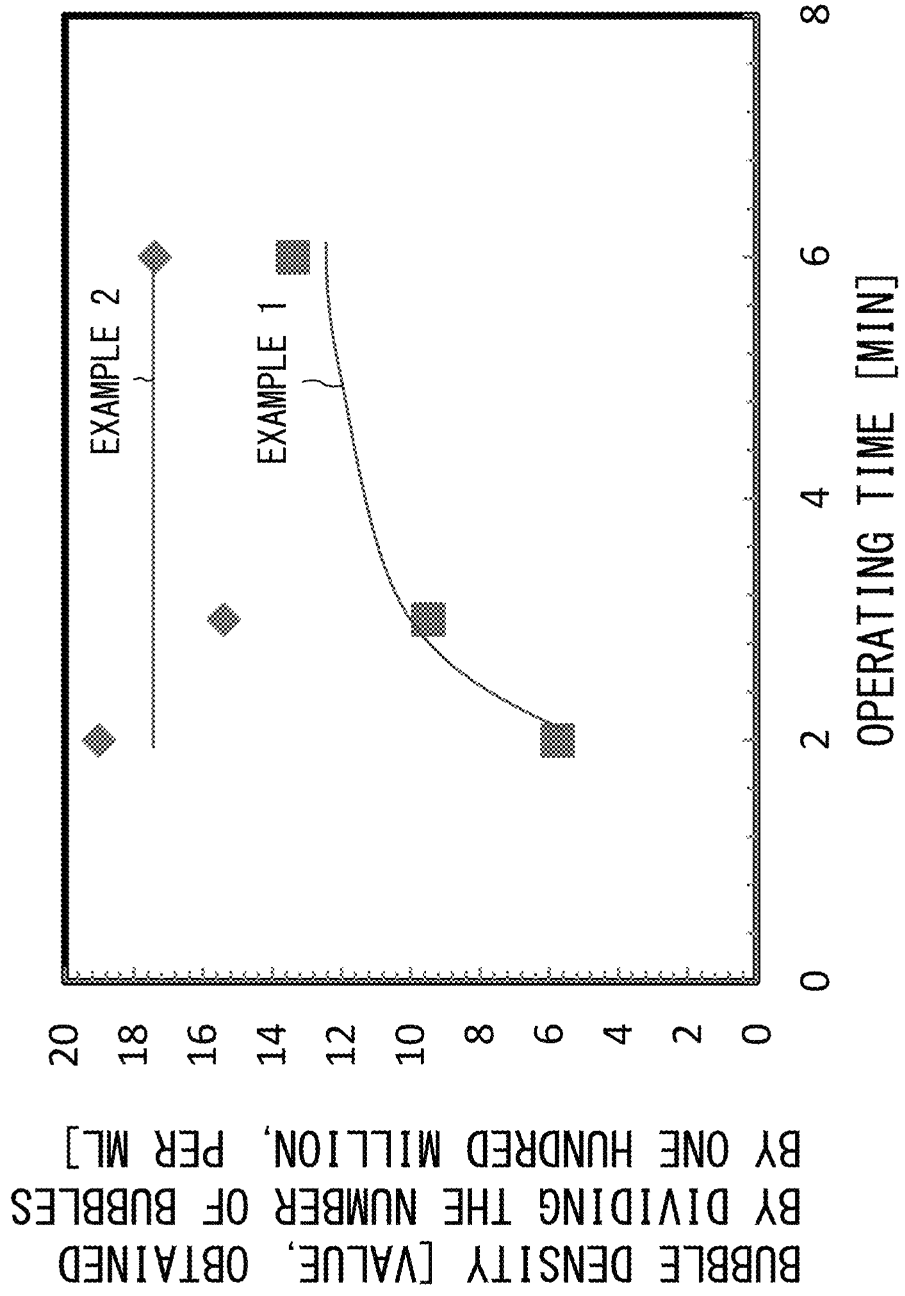
FIG. 7 is a graph indicating the bubble densities of gas-liquid mixed fluids according to Examples 1 and 2.

FIG. 7 is a graph indicating the bubble density of the gas-liquid mixed fluid FL obtained in Example 2. For comparison purposes, FIG. 7 reindicates the results of Example 1. As illustrated in FIG. 7, the high bubble density was obtained in Example 2 in comparison with Example 1. This result shows that the bubble density of the gas-liquid mixed fluid FL is enhanced due to the action described with reference to FIG. 3 by allowing the rotor 100 to be closer to a portion of the inner peripheral surface 222 of the container 200.

Evaluation 3

Figure 8:
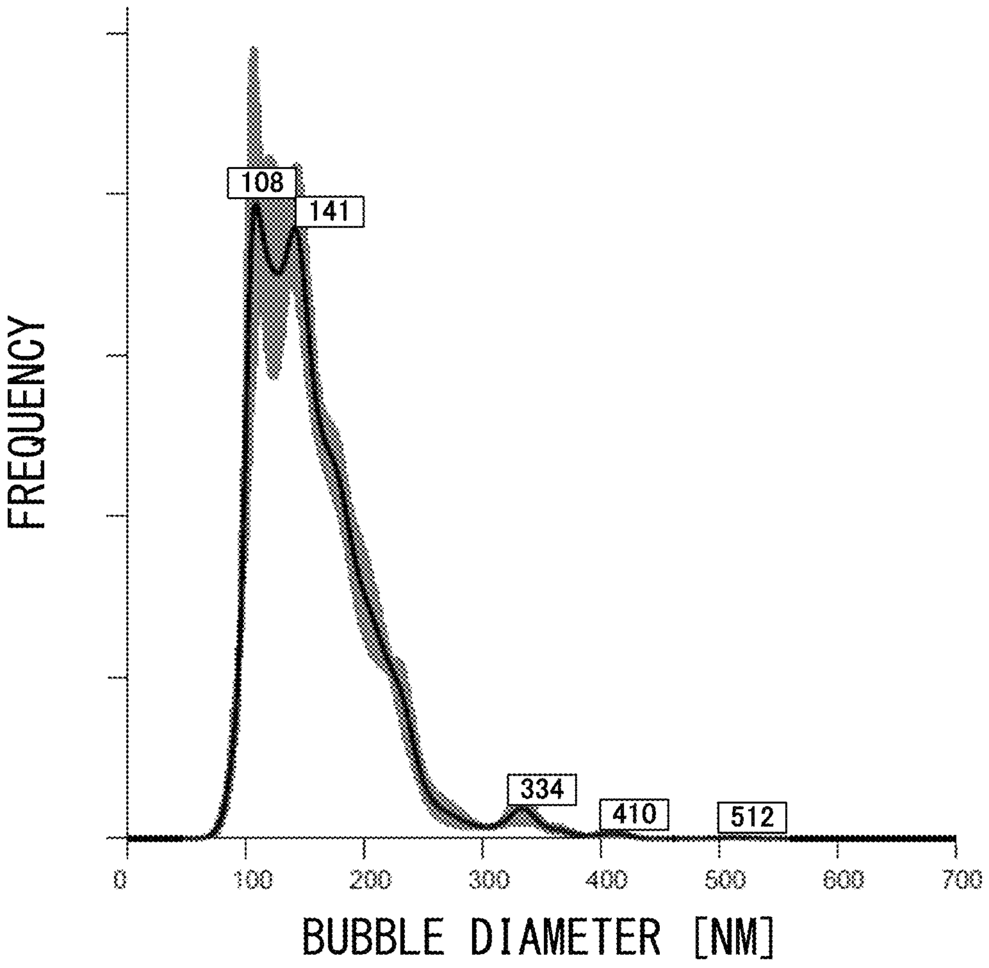
FIG. 8 is a graph indicating the frequency distribution according to the diameter of a bubble in a gas-liquid mixed fluid according to Example 2.

FIG. 8 indicates the frequency distribution according to the diameter of a bubble in the gas-liquid mixed fluid FL obtained in Example 2. The abscissa indicates the diameter of a bubble (hereinafter referred to as "bubble diameter"), and the ordinate indicates a frequency. Five samples of the gas-liquid mixed fluid FL according to Example 2 were prepared, and the frequency distribution of each sample was measured. FIG. 8 indicates ranges between the minimum and maximum values of the corresponding bubble diameters, set in the measurement results of the five samples. In FIG. 8, the bubble diameters at the positions of the local maximum points of the curved line representing the average of the measurement results of the five samples are additionally described in the vicinities of the local maximum points.

As illustrated in FIG. 8, the bubble diameters in the gas-liquid mixed fluid FL are 600 nm or less. In other words, ultrafine bubbles which are bubbles having a bubble diameter of 1 μm or less were confirmed to be able to be formed. The average value of the bubble diameters is less than 200 nm, specifically around 100 nm. Here, the average value refers to a mode diameter that is a bubble diameter with the highest frequency.

Evaluation 4

Figure 9:
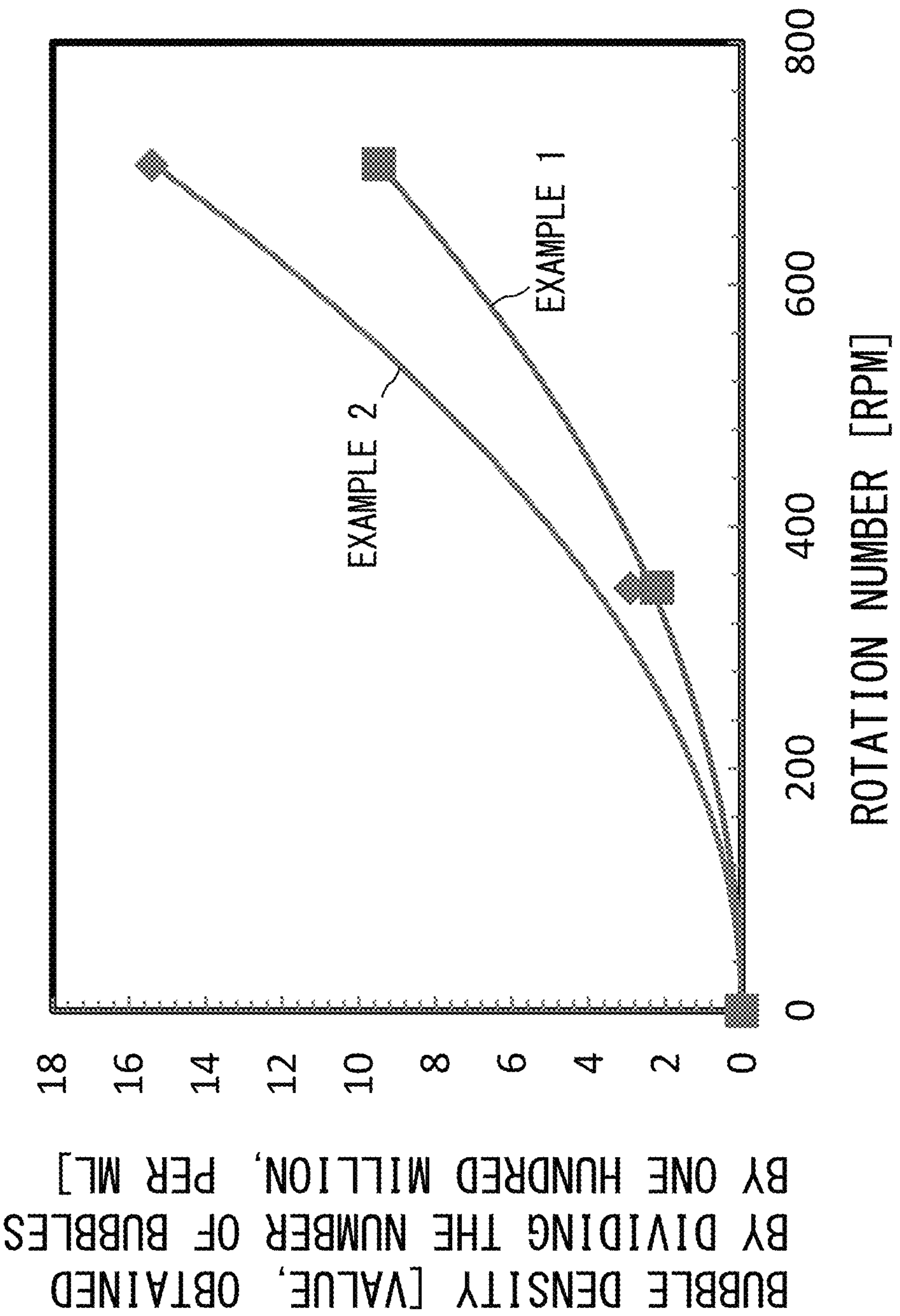
FIG. 9 is a graph indicating the dependencies of the bubble densities of the gas-liquid mixed fluids according to Examples 1 and 2 with respect to the rotation number of a rotor per unit time.

FIG. 9 is a graph indicating the dependencies of the bubble densities of the gas-liquid mixed fluids FL according to Examples 1 and 2 with respect to the rotation number of the rotor 100. Operating time was set at 3 minutes. As illustrated in FIG. 9, the bubble density is increased with increasing the rotation number of the rotor 100 in both of Examples 1 and 2.

Accordingly, the higher rotation number of the rotor 100 is preferred. Specifically, the rotation number of the rotor 100 is preferably 200 rpm or more, more preferably 400 rpm or more, and more preferably 600 rpm or more.

Example 3

A gas-liquid mixed fluid FL was formed under the same conditions as those of Example 2 except that the outer diameter of a rotor 100 was set at 15 mm.

Example 4

A gas-liquid mixed fluid FL was formed under the same conditions as those of Example 2 except that the outer diameter of a rotor 100 was set at 10 mm.

Evaluation 5

Figure 10:
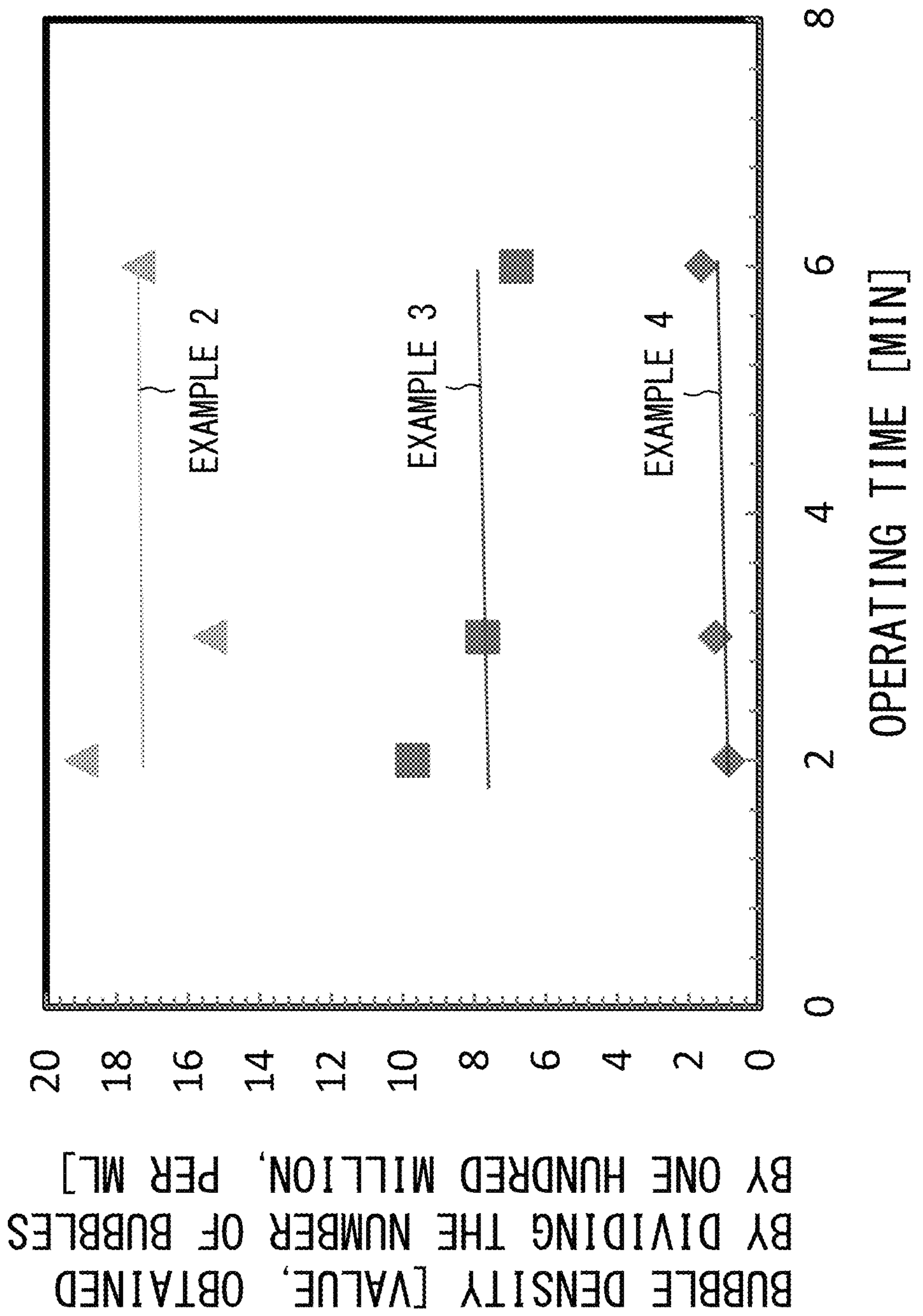
FIG. 10 is a graph indicating the bubble densities of gas-liquid mixed fluids according to Examples 2 to 4.

FIG. 10 is a graph indicating the bubble densities of the gas-liquid mixed fluids FL obtained in Examples 2 to 4. For comparison purposes, the results of Example 2 were reindicated. As illustrated in FIG. 10, the higher bubble density is obtained with the larger outer diameter of the rotor 100 when the rotation number of the rotor 100 is unchanged. This is because the rotation speed of the outer peripheral surface of the rotor 100 was increased with increasing the outer diameter of the rotor 100, and therefore, bubbles are more intensely sheared and stirred on the outer peripheral surface of the rotor 100.

Example 5

A gas-liquid mixed fluid FL was formed under the same conditions as those of Example 1 except that the outer diameter of a rotor 100 was set at 25 mm, and the inner diameter of a container 200 was set at 41 mm. The amount of purified water as a liquid LQ was adjusted so that the height of the water surface of the purified water was equal to the height of the upper surface of the rotor 100.

Example 6

A gas-liquid mixed fluid FL was formed under the same conditions as those of Example 1 except that the outer diameter of a rotor 100 was set at 60 mm, and the inner diameter of a container 200 was set at 69.5 mm. The amount of purified water as a liquid LQ was adjusted so that the height of the water surface of the purified water was equal to the height of the upper surface of the rotor 100.

Evaluation 6

Figure 11:
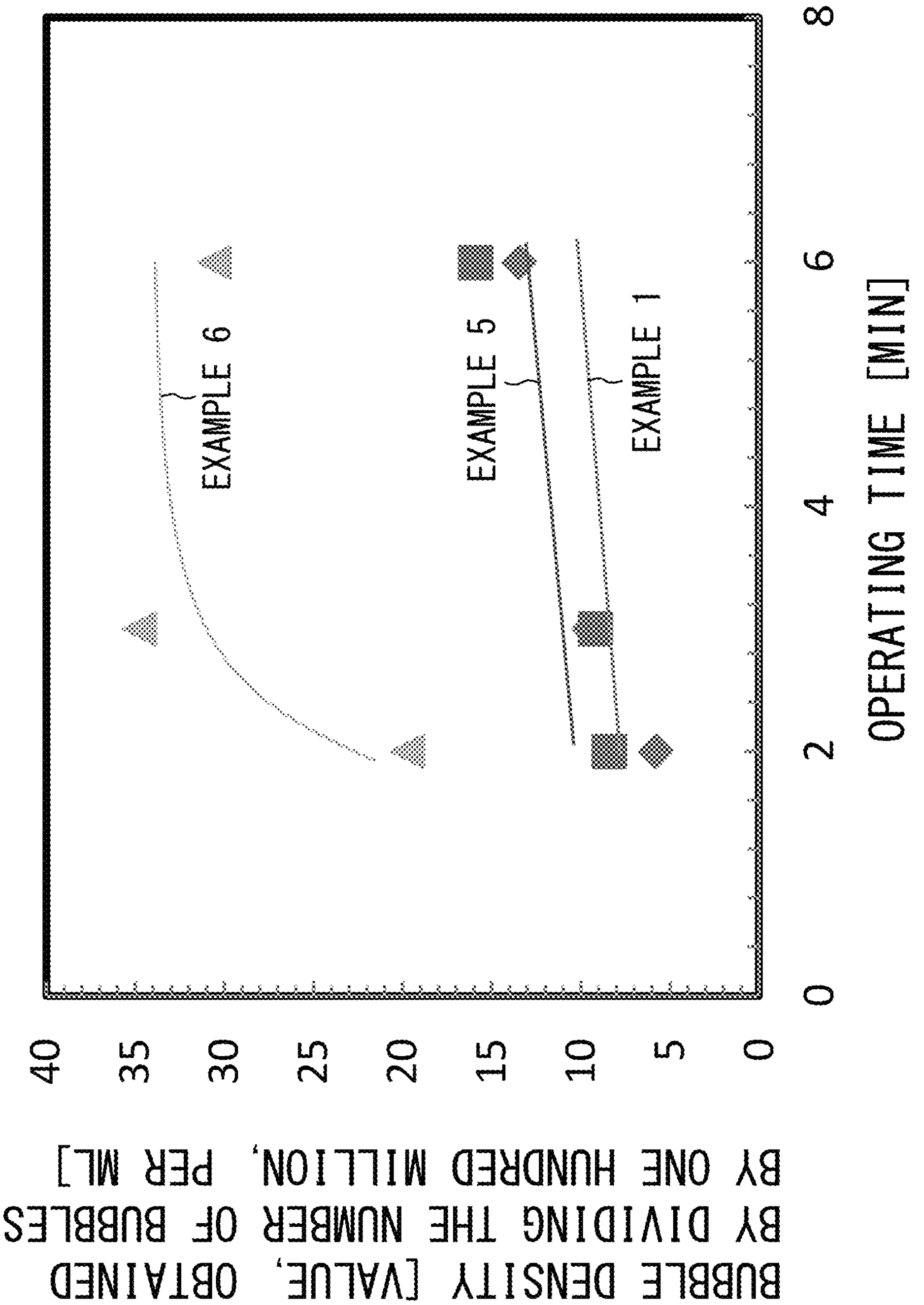
FIG. 11 is a graph indicating the bubble densities of gas-liquid mixed fluids according to Examples 1, 5, and 6.

FIG. 11 is a graph indicating the bubble densities of the gas-liquid mixed fluids FL obtained in Examples 1, 5, and 6. For comparison purposes, the results of Example 1 were reindicated. As illustrated in FIG. 11, the higher bubble density is obtained with the larger outer diameter of the rotor 100 when the rotation number of the rotor 100 is unchanged. Moreover, the amount of the purified water encapsulated in the container 200 is the largest in Example 6 of Examples 1, 5, and 6. In other words, use of the container 200 of and the rotor 100 of which the sizes are large enables the gas-liquid mixed fluid FL to be more efficiently obtained.

Embodiment 2

The example of the configuration in which the rotary device 300 causes the rotor 100 to rotate in a non-contact manner has been described in Embodiment 1 as described above. However, a configuration may be adopted in which a rotary device 300 and a rotor 100 are mechanically linked to each other. A specific example of the configuration will be described below.

Figure 12:
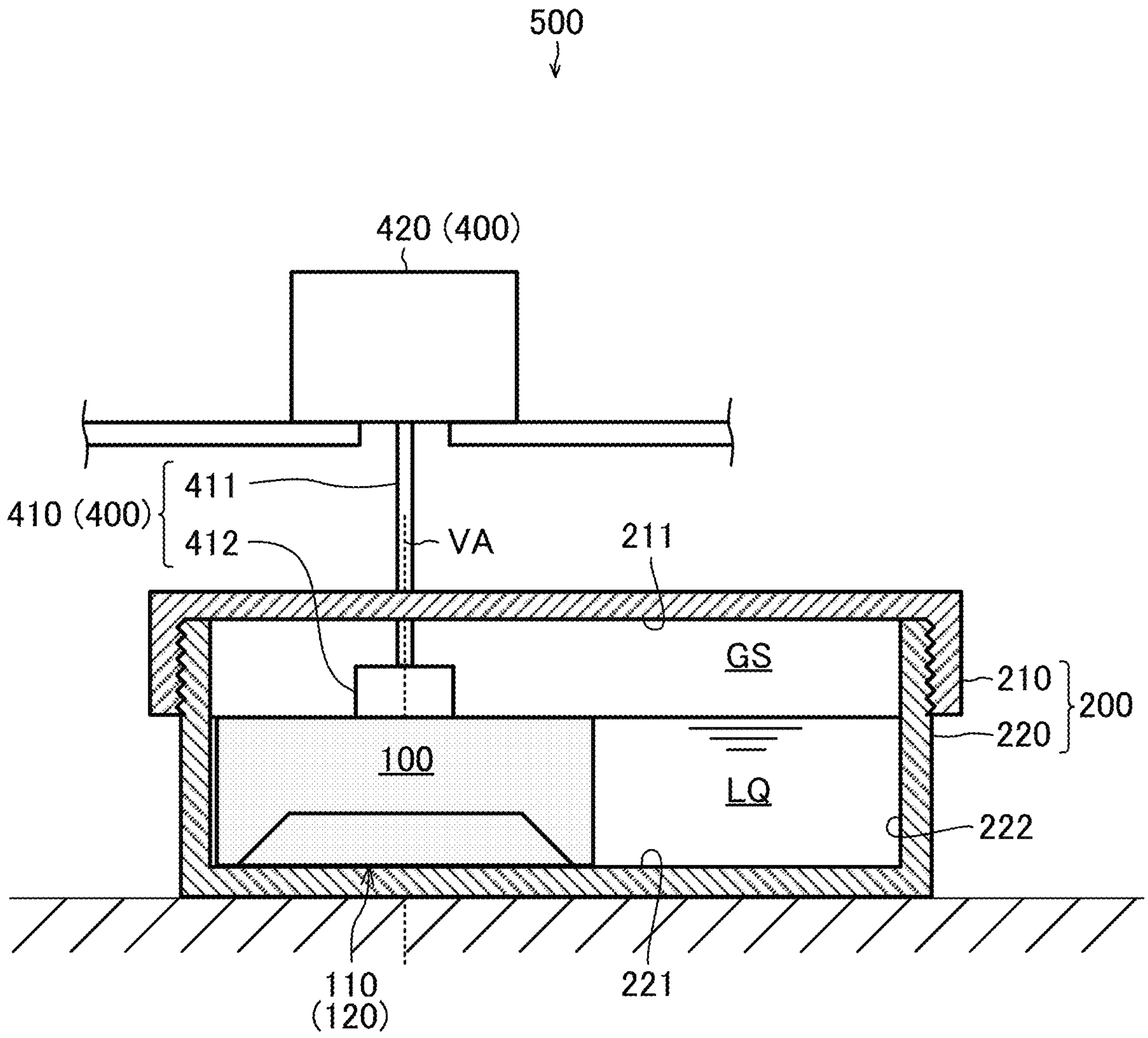
FIG. 12 is a conceptual diagram illustrating the configuration of a bubble formation apparatus according to Embodiment 2.

As illustrated in FIG. 12, a rotary device 400 that causes a rotor 100 to rotate is mechanically coupled to the rotor 100 in the present embodiment. The rotary device 400 includes: a linkage member 410 that is mechanically linked to the rotor 100; and a motor 420 that causes the rotor 100 to rotate via the linkage member 410.

The linkage member 410 includes: a rotation axis body 411 that extends in a rod form in a direction intersecting an inner lower surface 221 as a to-be-pressed surface of a container 200; and an elastic body 412 that is attached to the rotor 100.

The elastic body 412 is formed of a material having flexibility enabling elastic deformation, specifically, rubber. However, the elastic body 412 may be formed of a resin different from rubber. The elastic body 412 is allowed to adhere to a portion, intersecting a virtual rotation axis VA, of the upper surface of the rotor 100, with an adhesive.

The rotation axis body 411 extends along the virtual rotation axis VA. The lower end as one end of the rotation axis body 411 is connected to the upper surface of the rotor 100 via the elastic body 412. The upper end as the other end of the rotation axis body 411 is connected to a motor 420 placed above the container 200. The rotation axis body 411 may be formed of stainless steel or another metal, or may be formed of plastic or another resin.

The rotation axis body 411 penetrates the lid 210 of the container 200. A portion, through which the rotation axis body 411 penetrates, of the lid 210 serves as a bearing for the rotation axis body 411. The bearing has airtightness and fluid-tightness that prevent a gas GS and a liquid LQ from leaking outside the container 200.

The motor 420 rotates the rotation axis body 411 about the virtual rotation axis VA. As a result, the rotary torque of the rotation axis body 411 is transferred to the rotor 100 through the elastic body 412, to cause the rotor 100 to rotate.

Moreover, the rotary device 400 causes the rotor 100 to rotate in a state in which the rotor 100 is pressed against the inner lower surface 221 using the linkage member 410. Specifically, the rotary device 400 causes the rotor 100 to rotate while applying a thrust force, with which the rotor 100 is pressed against the inner lower surface 221, to the rotor 100 through the rotation axis body 411 and the elastic body 412.

The thrust force includes the loads of the rotation axis body 411 and the elastic body 412. As a result, a larger pressing force than the load of the rotor 100 acts between the inner lower surface 221 and the back surface portion 110 of the rotor 100, like the case of Embodiment 1.

The rotary device 400 may cause the rotor 100 to rotate in a state in which the rotor 100 is pressed against not only the inner lower surface 221 but also an inner peripheral surface 222. In such a case, the rotation axis body 411 preferably has elasticity that enables bending deformation. The elastic restoring force against bending, of the rotation axis body 411, enables the rotor 100 to be pressed against the inner peripheral surface 222.

As described above, the elastic body 412 is interposed between the rotation axis body 411 and the rotor 100 in the present embodiment. Therefore, even if axis deviation occurs in which the rotation axis body 411 deviates from the position of the virtual rotation axis VA while the motor 420 rotates the rotation axis body 411, the axis deviation is absorbed by the elastic deformation of the elastic body 412. Accordingly, the rotary device 400 enables the continuous stable rotation of the rotor 100. Other actions and effects are similar to those of Embodiment 1.

Example 7

A rotor 100 having an outer diameter of 60 mm, purified water as a liquid LQ, and air as a gas GS were encapsulated in a cylindrical-shaped container 200 having an inner diameter of 67 mm. The rotary device 400 illustrated in FIG. 12 causes the rotor 100 to rotate, to thereby form a gas-liquid mixed fluid FL. The amount of the purified water was set at 100 mL. The rotation number of the rotor 100 was set at 2800 rpm. Operating time was set at 2 minutes.

As illustrated in FIG. 12, the rotor 100 is provided to be closer to a portion of the inner peripheral surface 222 of the container 200. In other words, the rotary device 400 causes the rotor 100 to rotate in a state in which the rotor 100 is pressed against not only the inner lower surface 221 but also the inner peripheral surface 222. A value corresponding to the dimension of the gap GP2 illustrated in FIG. 3 was set at 0.5 mm or less.

Evaluation 7

Figure 13:
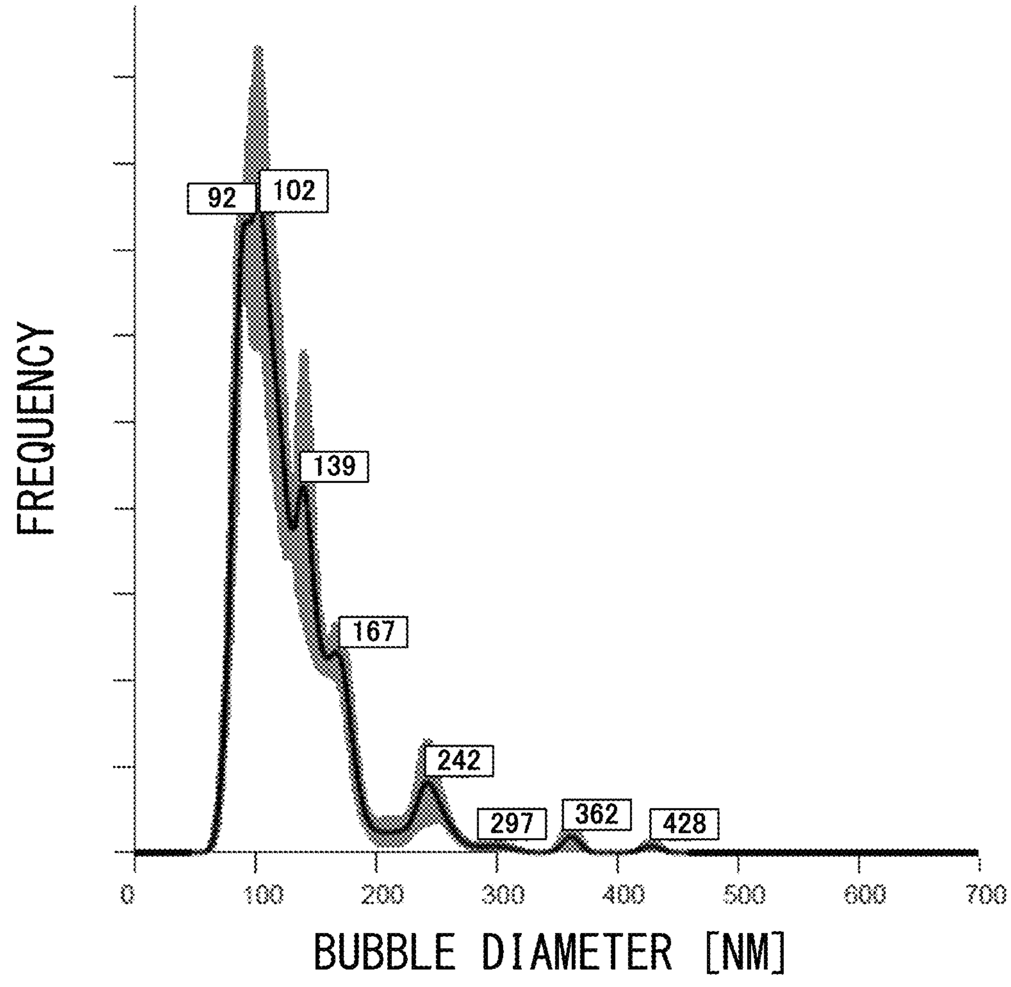
FIG. 13 is a graph indicating frequency distributions according to the diameter of a bubble in a gas-liquid mixed fluid according to Example 7.

FIG. 13 indicates frequency distributions according to the diameter of a bubble in the gas-liquid mixed fluid FL obtained in Example 7. The abscissa indicates a bubble diameter, and the ordinate indicates a frequency. Five samples of the gas-liquid mixed fluid FL according to Example 7 were prepared, and the frequency distribution of each sample was measured. FIG. 13 indicates ranges between the minimum and maximum values of the corresponding bubble diameters, set in the measurement results of the five samples. In FIG. 13, the bubble diameters at the positions of the local maximum points of the curved line representing the average of the measurement results of the five samples are additionally described in the vicinities of the local maximum points.

As illustrated in FIG. 13, the bubble diameters in the gas-liquid mixed fluid FL are 600 nm or less. In other words, ultrafine bubbles which are bubbles having a bubble diameter of 1 μm or less were confirmed to be able to be formed. The average value of the bubble diameters is less than 200 nm, specifically around 100 nm.

Embodiment 3

In Embodiment 1 as described above, an operation of opening and closing the lid 210 on the body 220 was required whenever the liquid LQ and the gas GS are introduced into the container 200, and the gas-liquid mixed fluid FL is discharged from the container 200. A container 200 may include a configuration in which it is possible to introduce a liquid LQ and a gas GS, and to discharge a gas-liquid mixed fluid FL, without opening and closing of a lid 210. A specific example of the configuration will be described below.

Figure 14:
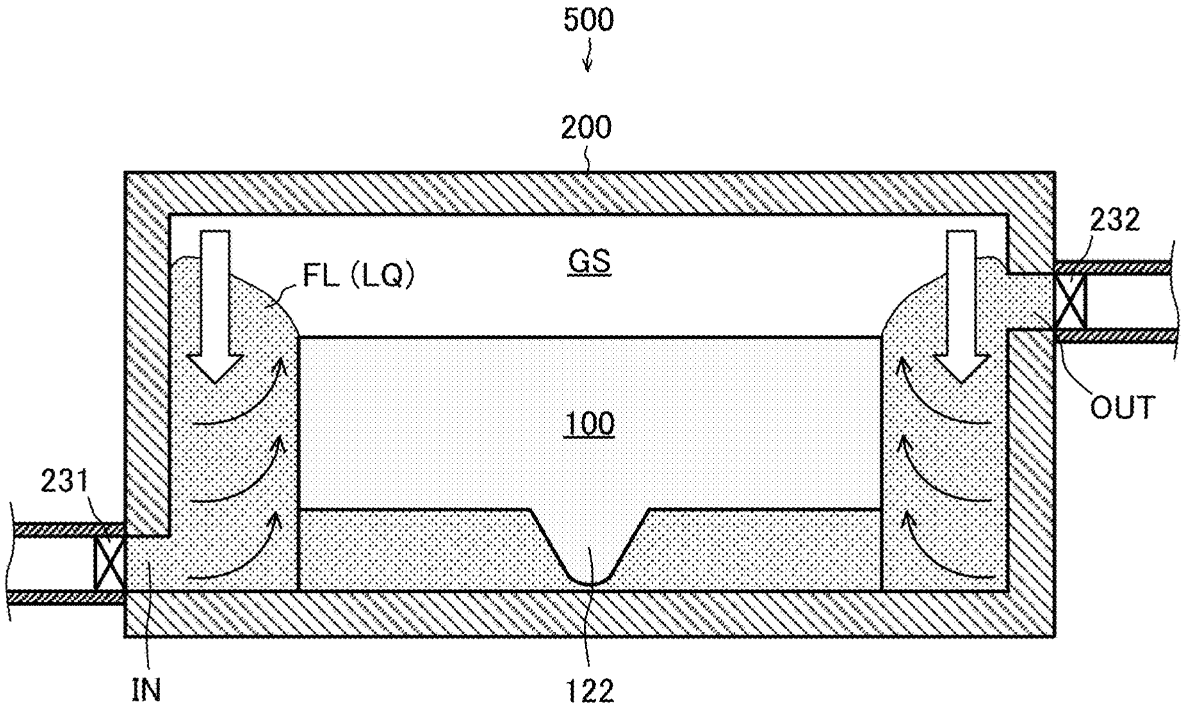
FIG. 14 is a conceptual diagram illustrating the configuration of a bubble formation apparatus according to Embodiment 3.

As illustrated in FIG. 14, an inlet IN through which a liquid LQ and a gas GS are introduced, and a discharge port OUT from which a gas-liquid mixed fluid FL is discharged are provided in a container 200 in a bubble formation apparatus 500 according to the present embodiment.

The discharge port OUT is placed at a position different from that of the inlet IN. Specifically, the inlet IN is placed at the position that is lower than the upper surface of a rotor 100, and the discharge port OUT is placed at the position that is higher than the upper surface of the rotor 100.

Moreover, the bubble formation apparatus 500 according to the present embodiment includes: a first opening and closing valve 231 that allows opening and closing of the inlet IN; and a second opening and closing valve 232 that allows opening and closing of the discharge port OUT. Each of the first opening and closing valve 231 and the second opening and closing valve 232 enables such opening or closing with desired timing.

In accordance with the present embodiment, the liquid LQ and the gas GS can be introduced into the container 200 through the first opening and closing valve 231 and the inlet IN, and the gas-liquid mixed fluid FL in the container 200 can be discharged to the outside through the second opening and closing valve 232 and the discharge port OUT. Therefore, the need for opening and closing the lid 210 illustrated in FIG. 1 is eliminated.

Moreover, the internal pressure of the container 200 can be easily adjusted to a value that is different from atmospheric pressure. Specifically, the internal pressure of the container 200 can be at a higher value than the atmospheric pressure by inserting the liquid LQ and the gas GS with a force into the container 200 through the first opening and closing valve 231 and the inlet IN in the state of closing the second opening and closing valve 232. Moreover, the internal pressure of the container 200 can be set at a lower value than the atmospheric pressure by drawing the gas GS through the second opening and closing valve 232 and the discharge port IN in the state of closing the first opening and closing valve 231 before the gas-liquid mixed fluid FL is formed.

Moreover, treatment other than batch treatment, that is, continuous treatment of discharging the gas-liquid mixed fluid FL from the container 200 while introducing the liquid LQ and the gas GS into the container 200 is also enabled by allowing the rotor 100 to rotate in the state of opening the first opening and closing valve 231 and the second opening and closing valve 232.

Embodiment 4

The example of the case of using the single bubble formation apparatus 500 has been described in Embodiment 3 as described above. However, a plurality of bubble formation apparatuses 500 may be used in combination. A specific example thereof will be described below.

Figure 15:
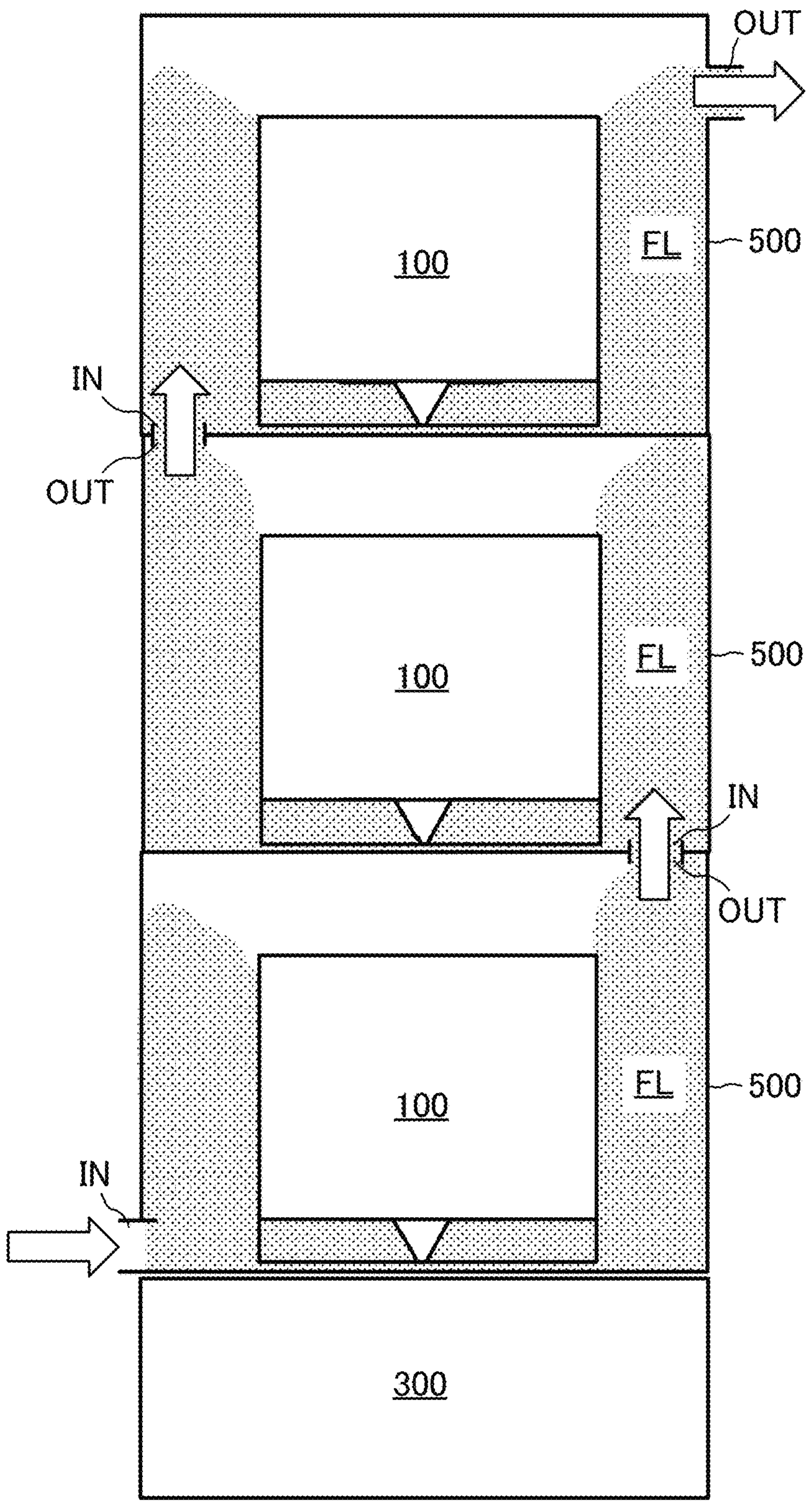
FIG. 15 is a conceptual diagram illustrating an aspect of use of a bubble formation apparatus according to Embodiment 4.

As illustrated in FIG. 15, three bubble formation apparatuses 500 stacked in a vertical direction are used in the present embodiment. The discharge port OUT of one bubble formation apparatus 500 communicates with the inlet IN of a bubble formation apparatus 500 stacked on the bubble formation apparatus 500.

A liquid LQ and a gas GS are introduced from the inlet IN of the bubble formation apparatus 500 in the bottom stage. The liquid LQ and the gas GS are moved upward with a centrifugal force caused by the rotation of a rotor 100 in each bubble formation apparatus 500 while the liquid LQ and the gas GS are mixed with each other. A gas-liquid mixed fluid FL is discharged from the discharge port OUT of the bubble formation apparatus 500 in the top stage.

In accordance with the present embodiment, the gas-liquid mixed fluid FL can be efficiently formed because the rotors 100 in the three bubble formation apparatuses 500 are allowed to concurrently rotate.

The first opening and closing valve 231 and the second opening and closing valve 232 illustrated in FIG. 14 are not illustrated in FIG. 15. However, the inlet IN of the bubble formation apparatus 500 in the bottom stage may be provided with a first opening and closing valve 231, and the discharge port OUT of the bubble formation apparatus 500 in the top stage may be provided with a second opening and closing valve 232.

Embodiment 5

FIG. 3 illustrates a configuration in which the virtual rotation axis VA is allowed to be eccentric with respect to the non-illustrated central axis of the container 200 having a circular shape in planar view. Depending on the shape of the container 200, there is a case in which the rotor 100 is provided to be closer to a portion of the inner peripheral surface 222 even when the virtual rotation axis VA is not allowed to be eccentric. A specific example of the case will be described below.

Figure 16:
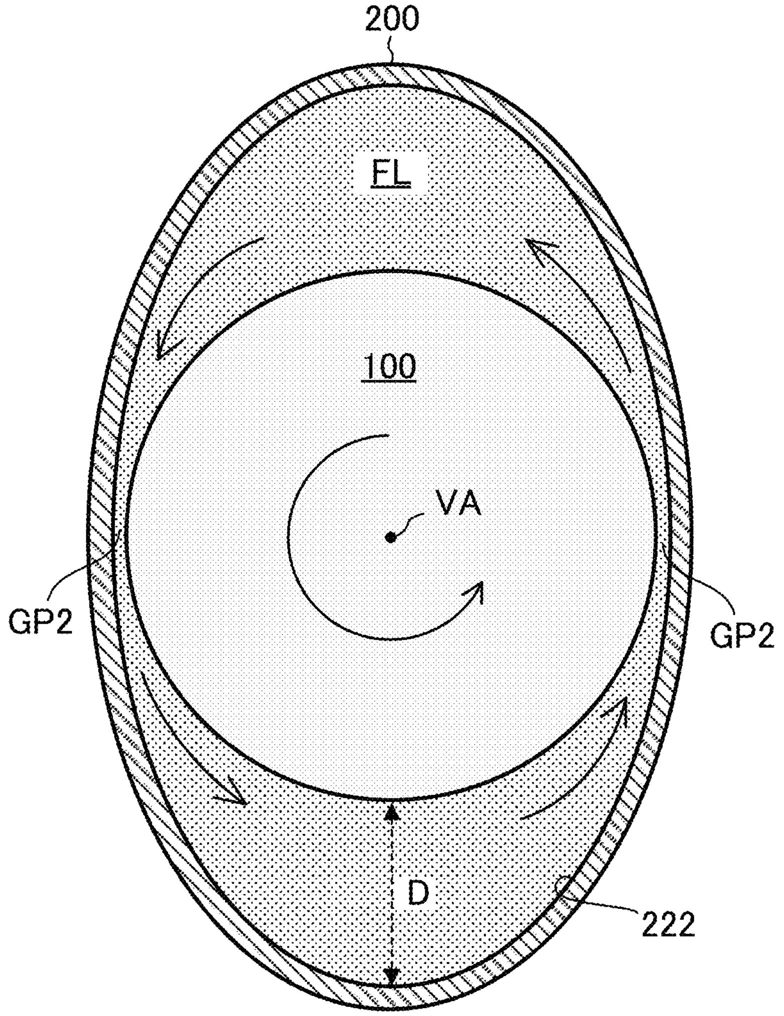
FIG. 16 is a plan view illustrating a container and a rotor according to Embodiment 5.

As illustrated in FIG. 16, a container 200 according to the present embodiment has an oval shape in planar view. The position of the central axis of the container 200 and the position of a virtual rotation axis VA coincide with each other; however, since the container 200 has the oval shape, a rotor 100 is provided to be closer to portions of the inner peripheral surface 222 of the container 200. Specifically, the rotor 100 is provided to be closer to the two portions, facing a minor-axis direction, of the inner peripheral surface 222 of the container 200.

Therefore, two locally narrowed gaps GP2 are disposed between the inner side surface 222 and the rotor 100. Accordingly, a gas-liquid mixed fluid FL can be efficiently formed in comparison with Embodiment 1 in which only the one gap GP2 is provided.

For allowing the pressurization of the gas-liquid mixed fluid FL in each gap GP2 and the depressurization of the gas-liquid mixed fluid FL in a case in which of the gas-liquid mixed fluid FL flows out of each gap GP2 to be more reliable, the dimensions of the gaps GP2 are preferably not more than D/20, more preferably not more than D/40, and more preferably not more than D/80 on the assumption that a maximum spacing between the rotor 100 and the inner peripheral surface 222 is D. Here, the maximum spacing D refers to a longitudinal direction spacing between the rotor 100 and the inner peripheral surface 222 in the configuration illustrated in FIG. 16.

Embodiment 6

FIG. 3 illustrates the configuration in which both the inner peripheral surface 222 of the container 200 and the outer peripheral surface of the rotor 100, facing the inner peripheral surface 222, are smoothly provided. However, at least one of the outer peripheral surface of a rotor 100 or the inner peripheral surface 222 of a container 200 may have a second recess-and-projection structure. A specific example thereof will be described below.

Figure 17:
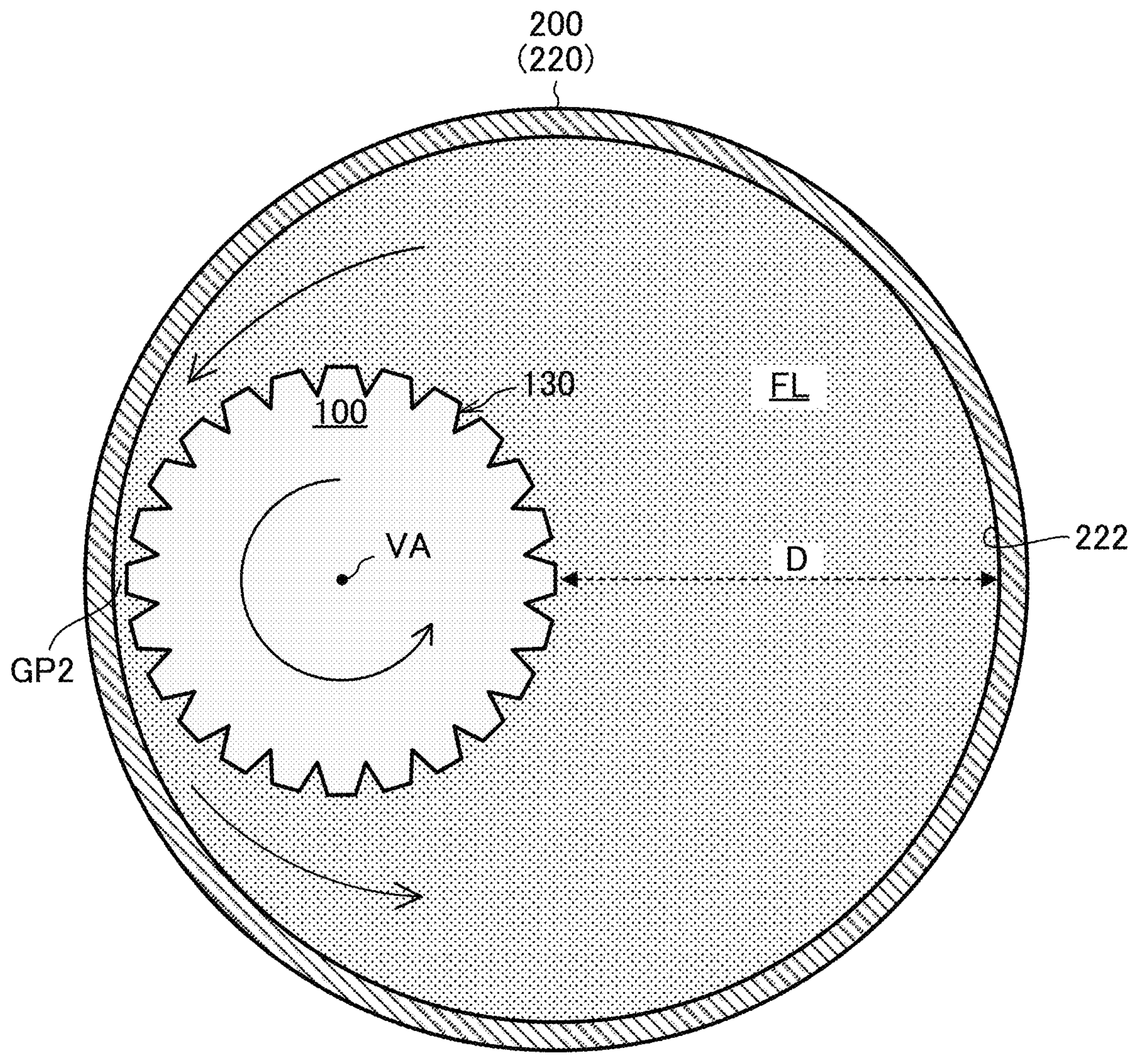
FIG. 17 is a plan view illustrating a container and a rotor according to Embodiment 6.

As illustrated in FIG. 17, a second recess-and-projection structure 130 is provided on the outer peripheral surface, facing the inner peripheral surface 222 of a container 200, of a rotor 100 in the present embodiment. The second recess-and-projection structure 130 includes recesses and projections placed in a circumferential direction around a virtual rotation axis VA. In accordance with the present embodiment, pressurization and depressurization of a gas-liquid mixed fluid FL are periodically repeated between the second recess-and-projection structure 130 and the inner peripheral surface 222. As a result, bubbles can be more efficiently formed than in a case in which the second recess-and-projection structure 130 is absent.

The embodiments of the present disclosure have been described above. The present disclosure is not limited thereto, and modifications described below are also possible.

FIG. 1 illustrates the configuration in which the first recess-and-projection structure 120 is provided on the back surface portion 110 of the rotor 100, of the back surface portion 110 of the rotor 100 and the inner lower surface 221 of the container 200. However, formation of the first recess-and-projection structure 120 on the inner lower surface 221 of the container 200 is also acceptable instead of the formation of the first recess-and-projection structure 120 on the rotor 100. Such first recess-and-projection structures 120 may be provided on both the rotor 100 and the inner lower surface 221.

However, it is preferable that at least the rotor 100, of the rotor 100 and the inner lower surface 221, has a first recess-and-projection structure 120. The formation of the first recess-and-projection structure 120 on the rotating rotor 100 enables the strong swirl flow of the liquid LQ and the gas GS in the container 200 and the efficient formation of the gas-liquid mixed fluid FL in comparison with the case of the formation of the first recess-and-projection structure 120 only on the inner lower surface 221.

FIG. 3 illustrates the container 200 having a circular shape in planar view parallel to the virtual rotation axis VA, and FIG. 16 illustrates the container 200 having an oval shape in planar view. However, the shape of the container 200 is not particularly limited. The container 200 may be provided to have a triangular, quadrangular, pentagonal, or more polygonal shape in planar view. Depending on the shape of the container 200, a plurality of locally narrowed gaps GP2 can be disposed between the inner side surface 222 and the rotor 100.

A bubble formation apparatus 500 may include a temperature regulator that regulates, via a container 200, the temperatures of a liquid LQ and a gas GS in the container 200. The temperature regulator may cool the liquid LQ and the gas GS, or may heat the liquid LQ and the gas GS.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2019-094202, filed on May 20, 2019, the entire disclosure of which is incorporated by reference herein.

INDUSTRIAL APPLICABILITY

The bubble formation apparatus and the bubble formation method according to the present disclosure can be used for forming a gas-liquid mixed fluid including bubbles.

REFERENCE SIGNS LIST

100 Rotor
110 Back surface portion
120 First recess-and-projection structure (recess-and-projection structure)
121 Recess
122 Projection
130 Second recess-and-projection structure
200 Container
210 Lid
211 Inner upper surface
220 Body
221 Inner lower surface (to-be-pressed surface)
222 Inner peripheral surface (inner side surface)
231 First opening and closing valve
232 Second opening and closing valve
300, 400 Rotary device
410 Linkage member
411 Rotation axis body
412 Elastic body
420 Motor
500 Bubble formation apparatus
LQ Liquid
GS Gas
FL Gas-liquid mixed fluid
VA Virtual rotation axis
GP1, GP2 Gap
IN Inlet
OUT Discharge port

The invention claimed is:

1. A bubble formation apparatus comprising:
a rotor;
a container in which the rotor is housed together with a liquid and a gas, the container having an inner lower surface, an inner upper surface facing the inner lower surface, and an inner side surface that joins the inner upper surface and the inner lower surface to each other; and
a rotary device that causes rotation of the rotor with (i) a locally narrowed first gap being provided between the inner lower surface and a portion, pressed against the inner lower surface, of the rotor by the rotor being pressed against the inner lower surface of the container and (ii) a locally narrowed second gap being provided between the inner side surface and the rotor by the rotor being closer to a portion of the inner side surface of the container,
wherein a bubble is formed by (I) periodically repeating local pressurization of a mixture of the gas and the liquid in the first gap and depressurization of the mixture performed when the mixture flows out from the first gap, and (II) periodically repeating local pressurization of the mixture in the second gap and depressurization of the mixture performed when the mixture flows out from the second gap, due to the rotation of the rotor by the rotary device.

2. The bubble formation apparatus according to claim 1, wherein
the rotor has magnetism, and
the rotary device is magnetically coupled to the rotor via the container, to thereby cause the rotor to rotate with the rotor being pressed against the inner lower surface.

3. The bubble formation apparatus according to claim 1, wherein
the rotary device includes a linkage member that is mechanically linked to the rotor, and
the rotary device causes the rotor to rotate with the rotor being pressed against the inner lower surface using the linkage member.

4. The bubble formation apparatus according to claim 1, wherein at least one of a portion, pressed against the inner lower surface, of the rotor or the inner lower surface of the container has a recess-and-projection structure in which a recess and a projection are placed in a circumferential direction that is a direction of the rotation of the rotor.

5. The bubble formation apparatus according to claim 4, wherein the rotor has the recess-and-projection structure.

6. The bubble formation apparatus according to claim 1, wherein the container includes an inlet through which the liquid and the gas are introduced, and a discharge port that is placed at a position different from a position of the inlet, and through which a gas-liquid mixed fluid in which the gas allowed to be a bubble is dispersed in the liquid is discharged.

7. The bubble formation apparatus according to claim 1, wherein the rotor has an outer surface made of a resin having hydrophobicity.

8. A bubble formation method comprising:

encapsulating a rotor, together with a liquid and a gas, in a container having an inner lower surface, an inner upper surface facing the inner lower surface, and an inner side surface that joins the inner upper surface and the inner lower surface to each other; and causing rotation of the rotor with (i) a locally narrowed first gap being provided between the inner lower surface and a portion, pressed against the inner lower surface, of the rotor by the rotor being pressed against the inner lower surface of the container and (ii) a locally narrowed second gap being provided between the inner side surface and the rotor by the rotor being closer to a portion of the inner side surface of the container, wherein in the causing the rotation, a bubble is formed by (I) periodically repeating local pressurization of a mixture of the gas and the liquid in the first gap and depressurization of the mixture performed when the mixture flows out from the first gap and (II) periodically repeating local pressurization of the mixture in the second gap and depressurization of the mixture performed when the mixture flows out from the second gap, due to the rotation of the rotor by the rotary device.

9. The bubble formation apparatus according to claim 3, wherein the linkage member has elasticity that enables bending deformation, and the rotary device causes the rotor to rotate with the rotor being pressed against the inner side surface using elastic restoring force against the bending deformation of the linkage member.

10. The bubble formation apparatus according to claim 1, wherein the second gap has a dimension that is less than or equal to D/20 where D is the maximum value of a spacing between the rotor and the inner side surface.

11. The bubble formation apparatus according to claim 1, wherein the liquid has a liquid level height that is about equal to a height of the rotor's upper surface, while facing the inner upper surface of the container, and the gas is housed between the liquid level height of the liquid and the inner upper surface of the container.

12. A bubble formation apparatus comprising:

a rotor;

an enclosure in which the rotor is housed together with a liquid and a gas, the enclosure having an inner lower surface, an inner upper surface facing the inner lower surface, and an inner peripheral surface that joins the inner upper surface and the inner lower surface to each other; and a rotary device that causes rotation of the rotor with the rotor being pressed against the inner lower surface of the enclosure and closer to one side of the inner peripheral surface, wherein the rotary device is magnetically coupled to the rotor via the enclosure, to thereby cause the rotor to rotate with the rotor being pressed against the inner lower surface of the enclosure.

13. The bubble formation apparatus according to claim 12, wherein a bubble is formed by periodically repeating local pressurization of a mixture of the gas and the liquid in a gap between the inner surface of the enclosure and a portion.

14. The bubble formation apparatus according to claim 13, wherein the back surface portion of the rotor includes at least one projection and at least one recess.

15. The bubble formation apparatus according to claim 14, wherein the back surface portion of the rotor faces the inner lower surface of the enclosure.

16. The bubble formation apparatus according to claim 15, wherein the back surface portion of the rotor includes four projections and four recesses.

17. The bubble formation apparatus according to claim 14, wherein the rotor further includes at least one projection and at least one recess on its side surface facing the inner peripheral surface of the enclosure.

18. The bubble formation apparatus according to claim 12, wherein the upper inner surface of the enclosure is a removable lid.

* * * * *